(12) United States Patent
Benedetti et al.

(10) Patent No.: US 11,801,721 B2
(45) Date of Patent: Oct. 31, 2023

(54) FASTENING DEVICE, INSULATION UNIT AND CORRESPONDING METHOD

(71) Applicant: P.E.I. PROTEZIONI ELABORAZIONI INDUSTRIALI S.R.L., Calderara di Reno (IT)

(72) Inventors: Michele Benedetti, Bologna (IT); Vittorio Mardegan, San Giovanni in Croce (IT)

(73) Assignee: P.E.I. PROTEZIONI ELABORAZIONI INDUSTRIALI S.R.L., Calderara di Reno (IT)

( * ) Notice: Subject to any disclaimer, the term of this patent is extended or adjusted under 35 U.S.C. 154(b) by 353 days.

(21) Appl. No.: 17/168,833

(22) Filed: Feb. 5, 2021

(65) Prior Publication Data

US 2021/0260945 A1 Aug. 26, 2021

(30) Foreign Application Priority Data

Feb. 21, 2020 (IT) .......................... 102020000003671

(51) Int. Cl.
*B60D 5/00* (2006.01)
*B60R 13/08* (2006.01)

(52) U.S. Cl.
CPC .............. *B60D 5/003* (2013.01); *B60R 13/08* (2013.01); *B60R 2013/0807* (2013.01)

(58) Field of Classification Search
CPC . B60R 13/08; B60R 2013/0807; F16B 19/02; F16B 21/09; F16B 5/065; F16B 5/0664; B61D 17/22
See application file for complete search history.

(56) References Cited

FOREIGN PATENT DOCUMENTS

| DE | 202016001988 U1 | 7/2016 |
|----|-----------------|--------|
| ES | 2348124 T3 | 11/2010 |
| FR | 1433434 A * | 4/1966 |
| FR | 1433434 A | 4/1966 |

OTHER PUBLICATIONS

Italian Search Report dated Oct. 12, 2020 from counterpart Italian Patent Application No. 202000003671.

* cited by examiner

*Primary Examiner* — Jacob M Amick
*Assistant Examiner* — Charles J Brauch
(74) *Attorney, Agent, or Firm* — SHUTTLEWORTH & INGERSOLL, PLC; Timothy J. Klima

(57) ABSTRACT

Described is a fixing device for fixing together a first and a second structure, each of said structures having at least a first and a second cavity, the device comprising a first and a second fixing element, each fixing element having a body comprising a seat and a pin, wherein:

the pin of the first fixing element is configured to be inserted, freely passing through, in the first cavities of the first and of the second structure and to be reversibly coupled to the seat of the second fixing element, and the pin of the second fixing element is configured to be inserted, freely passing through, in the second cavities of the first and of the second structure and to be reversibly coupled to the seat of the first fixing element.

10 Claims, 5 Drawing Sheets

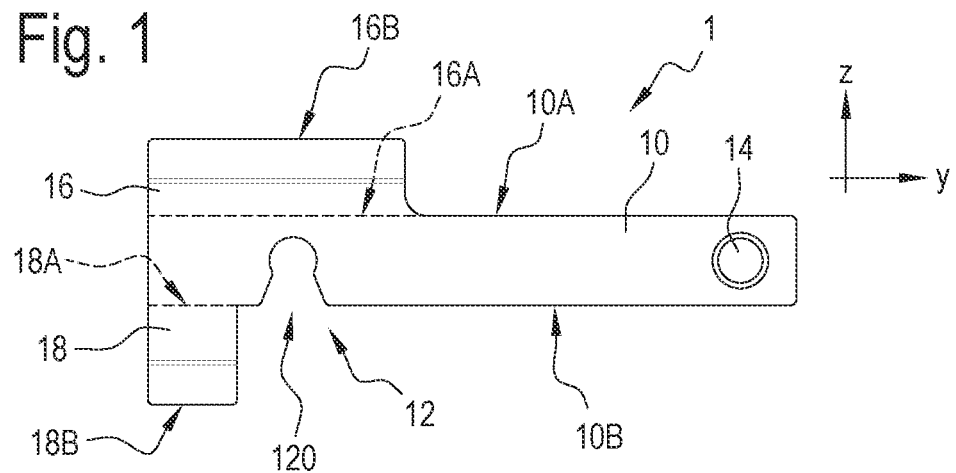
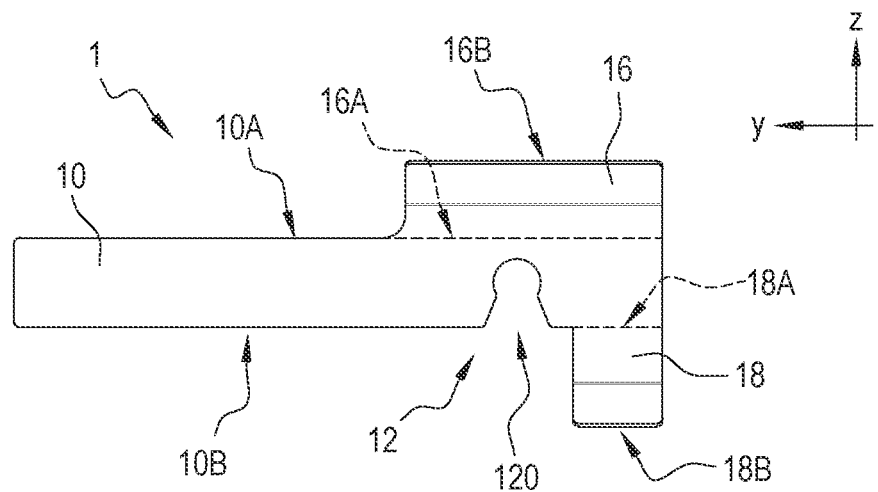
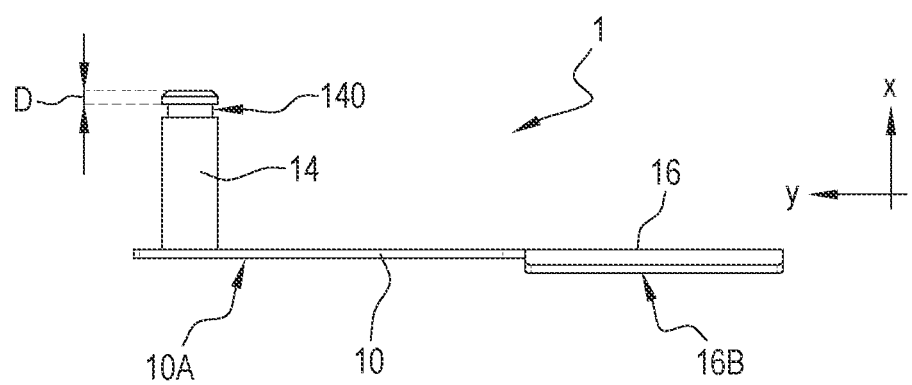

FASTENING DEVICE, INSULATION UNIT AND CORRESPONDING METHOD

This application claims priority to Italian Patent Application 102020000003671 filed Feb. 21, 2020, the entirety of which is incorporated by reference herein.

BACKGROUND OF THE INVENTION

This invention relates to a device for fixing a first structure to a second structure of articulated vehicles, for example articulated buses.

SUMMARY OF THE INVENTION

There are various prior art fixing devices between structures forming part of articulated vehicles, for example fixing devices between bellows in a passage section between adjacent carriages of an articulated vehicle.

However, the prior art devices have one or more drawbacks, in terms of weight, simplicity of use and/or durability.

One aim of this invention is to provide a fixing device which is able to overcome the drawbacks of the prior art, providing a fixing device which is particularly robust and able to be applied with extreme ease to articulated vehicles, during for example a use and a replacement.

A further aim of this invention is to provide a fixing device which is light and/or inexpensive.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate an example, non-limiting embodiment of the invention and in which:

FIGS. 1 to 5 are front, top, bottom and side views, respectively, of an element of the fixing device according to the invention;

DESCRIPTION OF THE PREFERRED EMBODIMENTS

Figure 4:
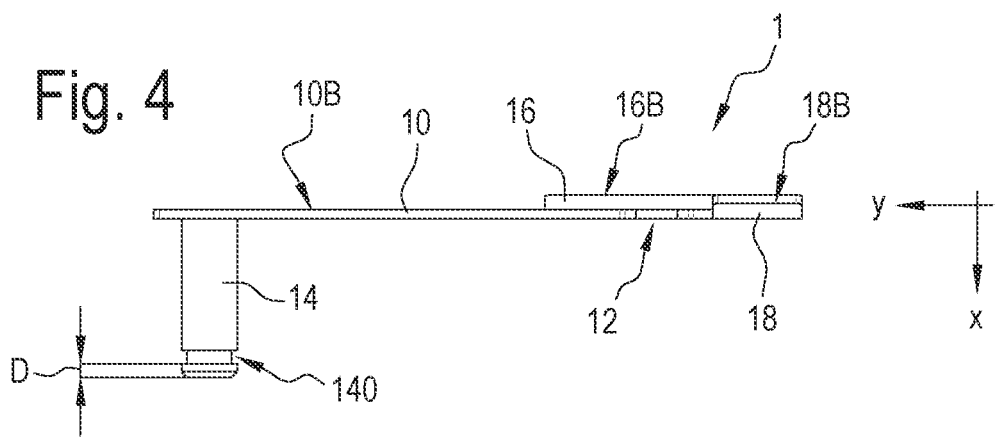

With reference to the accompanying drawings, the fixing device according to the invention is described with reference to a system of Cartesian axes X, Y, Z, wherein, in the drawings, the axis X represents a first longitudinal direction, the axis Y represents a second sideways direction and the axis Z represents a third vertical direction.

This description relates to a fixing device for fixing together a first and a second structure 3, 4. In the sector of articulated vehicles, between adjacent carriages, there is a passage section protected by an insulation unit 2 as described in more detail below with reference to FIGS. 9 to 13. The insulation unit 2 comprises a first structure 3, for example, lateral, and a second structure 4, for example, lower, which may be connected to each other by a plurality of fixing devices according to the invention. The first and second structures 3, 4 each have a first and a second cavity 30, 32 and 40, 42, for example at least at one lateral end.

The fixing device comprising a first fixing element 1 and a second fixing element 1, identical to each other and each having a body 10 comprising a seat 12 and a pin 14, such that:

the pin 14 of the first fixing element 1 is configured to be inserted, freely passing through, in the first cavities 30, 40 of the first 3 and of the second 4 structure and to be reversibly coupled to the seat 12 of the second fixing element 1, and the pin 14 of the second fixing element 1 is configured to be inserted, freely passing through, in the second cavities 32, 42 of the first 3 and of the second 4 structure and to be reversibly coupled to the seat 12 of the first fixing element 1.

The pin 14 can be inserted in the seat 12 passing freely, that is to say, the pin 14 can be inserted in the seat 12 by translation and is free to engage with the seat 12. In other words, the pin 14 is configured to be inserted inside the seat 12 with the possibility of sliding inside the seat 12 (it is, in fact, inserted by sliding). Preferably, if inserted in the seat 12, the pin 14 can rotate about an axis of rotation of the pin 14 parallel to the first direction X.

With reference to FIGS. 1 to 5, one of either the first fixing element 1 or the second fixing element 1 is illustrated by means, respectively, of opposite front views, from above, from below and from the side.

The body 10 of the fixing element 1 may comprise a plate which extends along the second direction Y, for example the plate may have a substantially rectangular shape. The body 10 has a first lateral portion and a second lateral portion. The pin 14 may be located at the first lateral portion and/or the seat 12 may be located at the second lateral portion.

The body 10 may have a first surface 10A, for example upper, and a second surface, 10B, for example lower. The seat 12 may be at the second surface 10B and/or the pin 14 may be at an intermediate point between the first and the second surface 10A, 10B.

According to one or more embodiments, the pin 14 comprises a first end and a second end opposite the first end, wherein the first end is connected to the body 10 of the fixing element 1 and wherein the pin 14 can be coupled to the seat 12 at the second end.

The pin 14 may extend in length along the first direction X. The pin 14 may have any shape, preferably the pin 14 has a substantially circular cross section.

The pin 14 may comprise a recess 140 configured to engage with the seat 12, where the recess 140 defines a reduction in the thickness of the pin 14. In this way, the pin 14 has a first thickness at the recess 140 and a second thickness, greater than the first thickness, at least in the proximity of the recess 140. Preferably, the pin 14 has the first thickness at the recess and the second thickness otherwise. The recess may be of the annular type, that is to say, it may run around the pin 14 or it may only be at a portion of the pin 14 at a point of connection with the seat 12. The recess 140 may be located at a predetermined distance D from the second end of the pin 14. For example, the recess 140 of the pin 14 may extend longitudinally along the first direction X at least equal to a thickness of the seat 12, for example equal to a thickness of the body 10 of the fixing element 1. As may be seen in FIG. 6, the pin 14 may come into contact with the seat 12 at the recess 140. The seat 12 can thus be inserted into the recess 140 during the coupling between the pin 14 and the seat 12. Advantageously, in this way the coupling between the pin 14 and the seat 12 is more secure since the possibility of the pin 14 being accidentally extracted from the seat 12 is reduced.

The pin 14 is configured to be inserted, for example slidably through a translation, inside one of the cavities 30, 32, 40, 42 and be coupled to the seat 12, for example by means of a rotational movement of the fixing element 1 about the axis of rotation of the pin 14, parallel to the first direction X. Preferably, the step of inserting the pin 14 in one of the cavities 30, 32, 40, 42 occurs before the step of rotating the fixing element 1 about the axis of rotation of the pin 14.

According to one or more embodiments, the seat 12 comprises a groove made in the body 10 of the fixing element 1. The shape of the seat 12 may be substantially equal to a larger circular arc, that is to say, an arc greater than a semi-circle. In other words, the seat 12 may have a substantially circular shape interrupted only by an arc less than a semi-circle.

The seat 12 may comprise an opening 120 for inserting the pin 14 in the seat 12. The opening may be defined by interrupting the circumference, that is, the smaller arc shaped to match the larger arc defining the seat 12. The opening 120 may have a minimum width equal to or greater than the thickness of the pin 14 at the recess 140. Advantageously, the shape of a larger circular arc of the seat 12 facilitates a stable coupling between the seat 12 and the pin 14, since it reduces the possibility of the pin 14 accidentally coming out of the seat 12.

According to one aspect, at least one portion of the body 10 of the fixing element 1 at the seat 12 may be tapered along the third vertical direction Z. Preferably, both of the portions of body 10 adjacent to the seat 12 may be tapered along the third direction Z. In this way, the opening 120 narrows away from the second surface 10B of the body 10. For example, the width of the opening 120 at the second surface 10B is in a range between the first thickness of the pin 14 and the second thickness of the pin 14, preferably its width being equal to the second thickness of the pin 14 close to the recess 140. Generally speaking, the width of the opening 120 for inserting the pin 14 may be variable between the first thickness of the pin 14 and the second thickness of the pin 14. For example, the opening 120 may have a maximum width at the second surface 10B and a minimum width at a joining point between the tapered portion and the larger circular arc; in other words, the seat 12 and the opening 120 may have a shape similar to a lock. Advantageously, the presence of a taper at the seat 12 facilitates insertion of the pin 14 in the seat 12 since it is able to insert in a predetermined position in a facilitated manner.

According to one or more embodiments, the body 10 of the fixing element 1 may be connected to one or more tabs 16 and/or 18 close to the seat 12, preferably a first tab 16 and a second tab 18. As illustrated in the drawings, the body 10 may be connected to the one or more tabs 16, 18 at the second lateral portion, preferably at one end of it. The first tab 16 may be connected to the body 10 at the first surface 10A. The second tab 18 may be connected to the body 10 at the second surface 10B. For example, the second tab 18 may be close to the seat 12, preferably the second tab 18 may be closer to a lateral end of the body 10 of the fixing element 1 relative to the seat 12. The first and second tabs 16, 18 may be similar in width with respect to the second direction Y or the first tab 16 may have a width greater than the second tab 18. For example, the second tab 18 may have a width greater than or equal to a width of the first tab 16 plus the width of the opening 120 of the seat 12 at the second surface 10B.

According to one aspect, the body 10, the seat 12, the pin 14 and the one or more tabs 16, 18 may be formed in a single piece. The fixing element 1 may be made of a metallic material.

Figure 5:
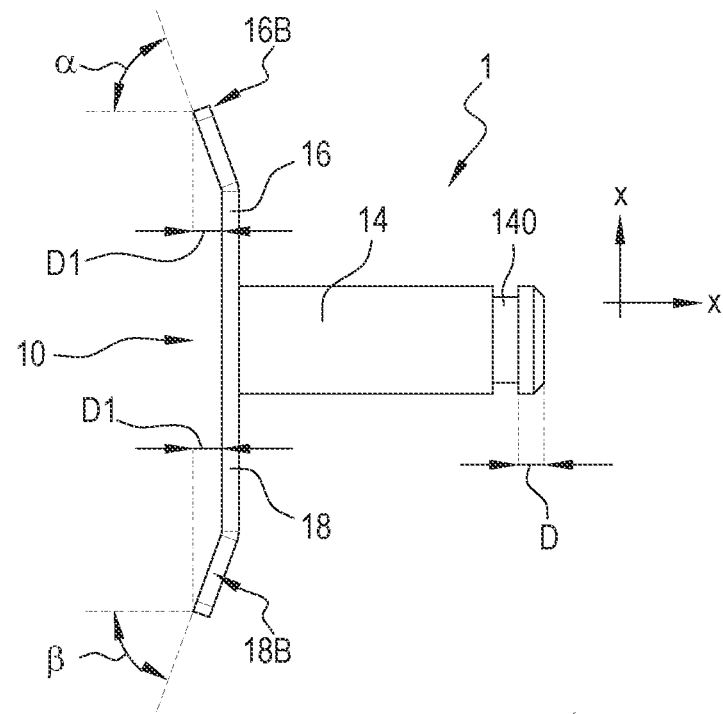

According to one aspect, each tab 16, 18 may comprise a plate having a first end 16A, 18A and a second end 16B, 18B opposite the first end 16A, 18A, such that the tab 16, 18 can be connected to the body 10 of the fixing element 1 at the first end 16A, 18A and/or such that the plate is at least partly folded, at the second end 16B, 18B, by a first or second predetermined angle α, β relative to the first direction X. FIG. 5 shows how the first tab 16 forms the first predetermined angle α with the first direction X and the second tab 18 forms the second predetermined angle β with the first direction X. Preferably, the first and second predetermined angle α, β have substantially the same value.

As may be seen in the non-limiting examples of the accompanying drawings, only a part of the tabs 16, 18 is folded. For this reason, the tabs 16, 18 extend at least partly along the third direction Z.

According to one aspect, the predetermined distance D of the recess 140 from the second end of the pin 14 is less than or equal to a distance D1 between the body 10 of the fixing element 1 and a projection of the second end 16B, 18B of the one or more tabs 16, 18 in a plane parallel to the first direction X, for example the distance D1 of the plane Y is defined as a distance, in a plane XY (z=k, where k is a numerical constant) of the projection of the second end 16B, 18B of the one or more tabs 16, 18 in the plane XY and an intersection of the body 10 with said plane XY.

Figure 6:
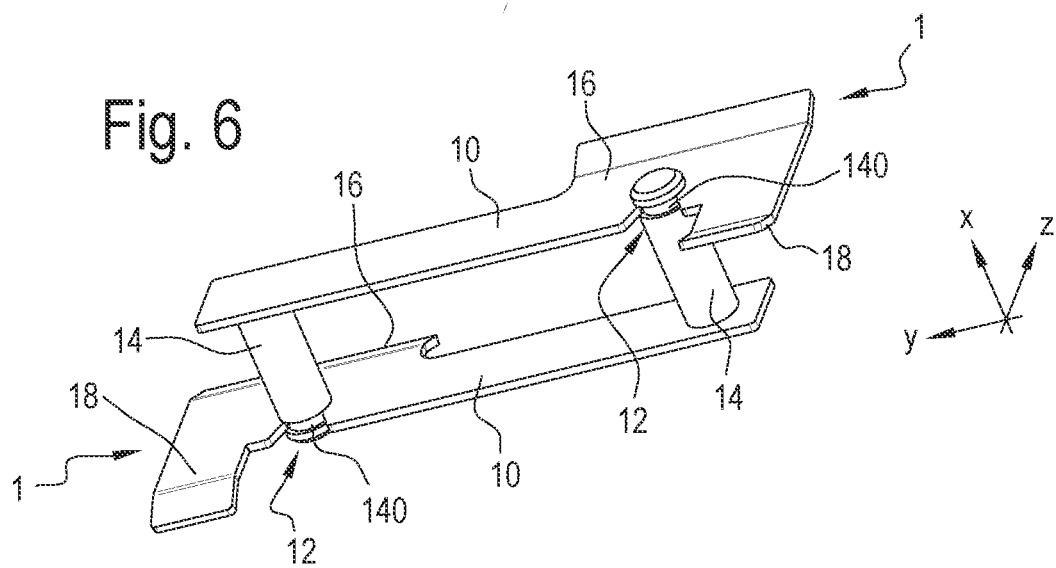
FIGS. 6 and 7 are views of the fixing device according to the invention when the fixing elements are coupled to each other.
Figure 7:
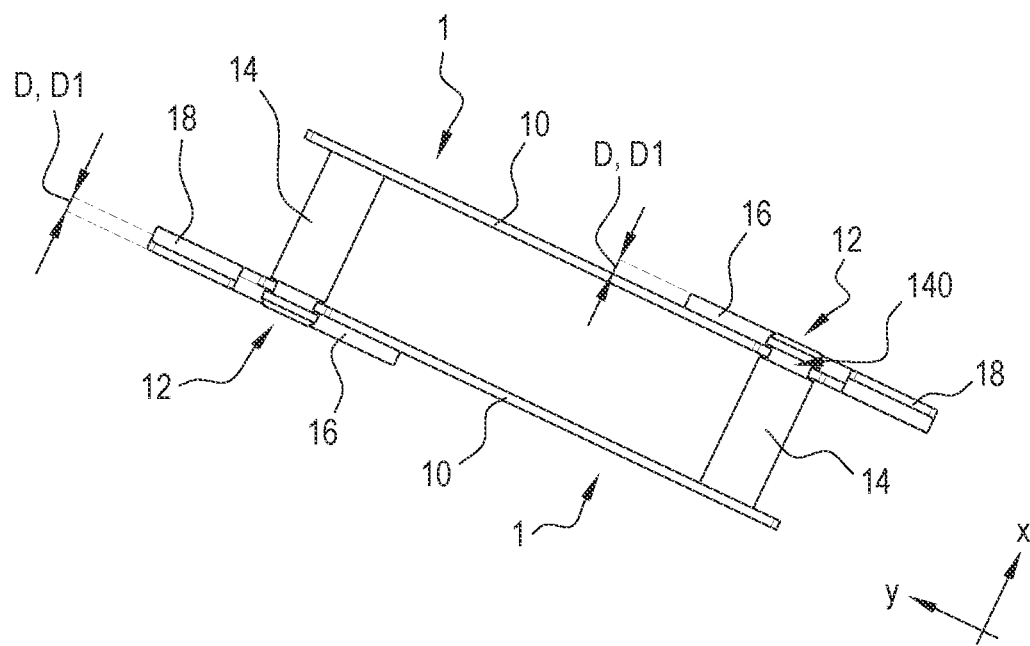
Figure 8:
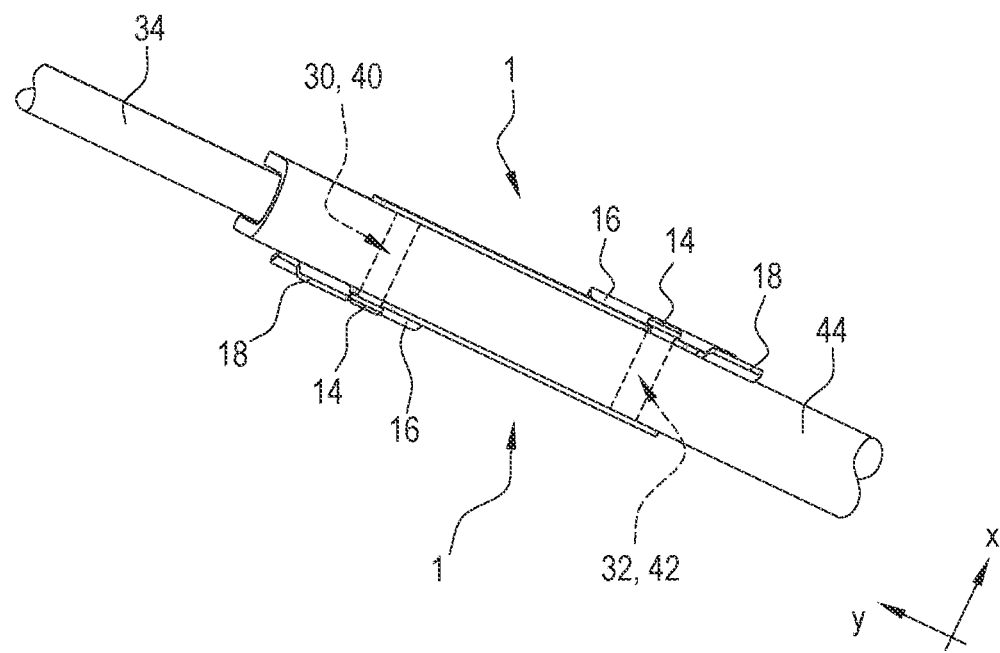
FIG. 8 shows the installation of an assembly device according to the invention.
Figure 9:
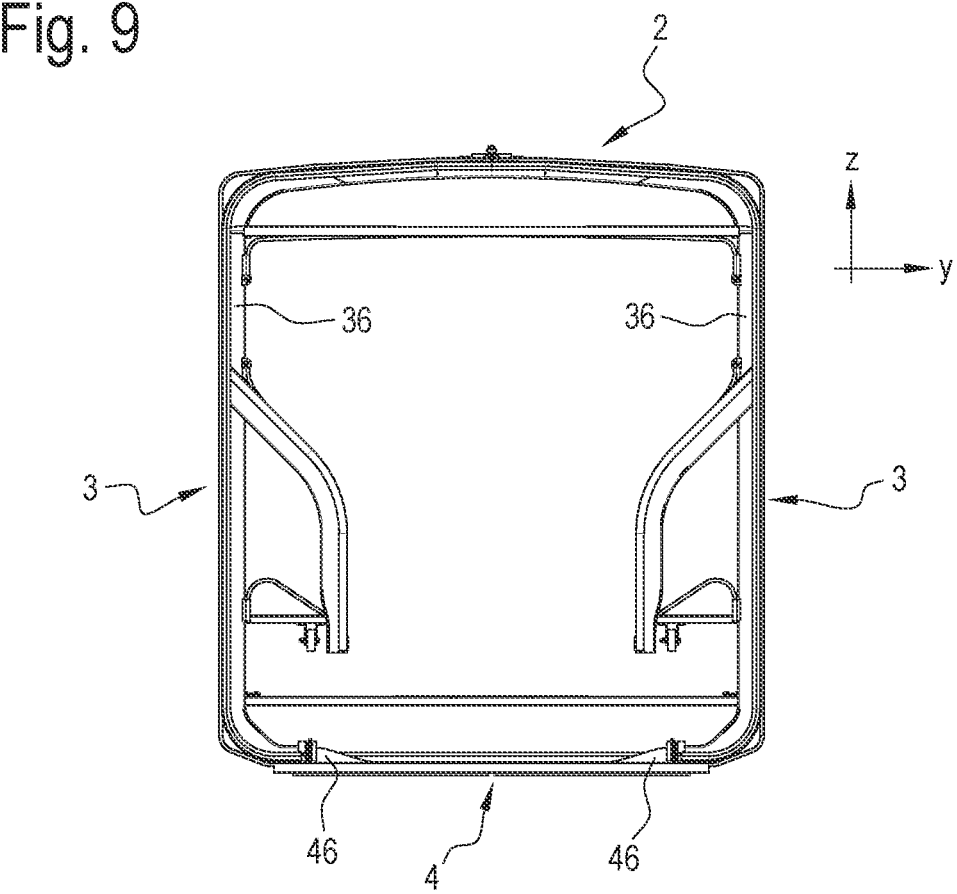
FIGS. 9 to 13 illustrate details of an insulation unit according to the invention.
Figure 10:
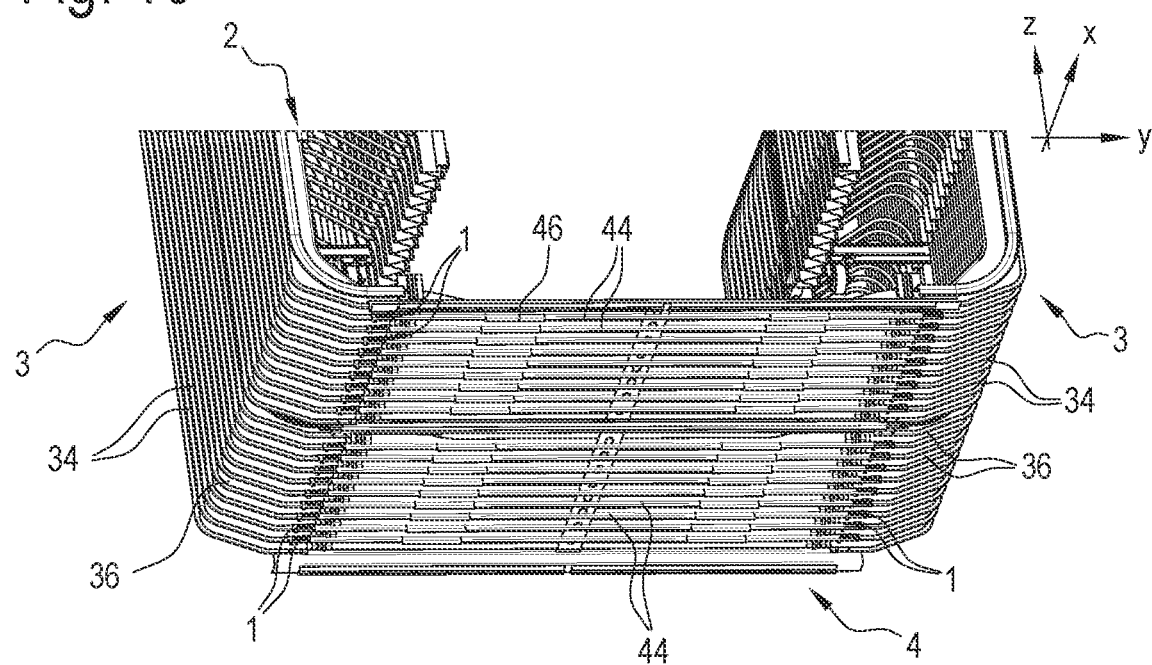

As may be observed in FIGS. 6, 7 and 8, if the first fixing element 1 is coupled to the second fixing element 1, a portion of the pin 14 of a fixing element, between the recess 140 and the second end, remains exposed beyond the body 10 of the other fixing element 1. Advantageously, the one or more tabs 16, 18 can protect the portion of the pin 14 from accidental impacts.

Advantageously, the presence of one or more tabs 16, 18 connected to the body 10 facilitates the fitting and the removal of the fixing elements 1.

FIGS. 7 and 8 show an example of coupling between two fixing elements 1 of the fixing device, in the absence of and in the presence of the first and second structures 3, 4.

For example, as illustrated in FIG. 8, the structures 3, 4 may comprise a plurality of slats 34, 44 which comprise a pair of cavities 30 and 32, 40 and 42 at least at one lateral end (shown by dashed lines in the drawings). For example, the drawings show a first slat 34 of the first structure 3 and a second slat 44 of the second structure 4. During coupling, the pin 14 of the first fixing element 1 is inserted through the first cavities 30, 40 of the first and second slat 34, 44 and the pin of the second fixing element 1 is inserted through the second cavities 32, 42 of the first and second slat 34, 44. During the coupling, the first element 1 is rotated about the axis of rotation X of the relative pin 14 and the seat 12 of the first fixing element 1 engages the pin 14 of the second fixing element 1. In the same way, the second element 1 is rotated about the axis of rotation X of the relative pin 14 and the seat 12 of the second fixing element 1 engages the pin 14 of the first fixing element 1.

Figure 11:
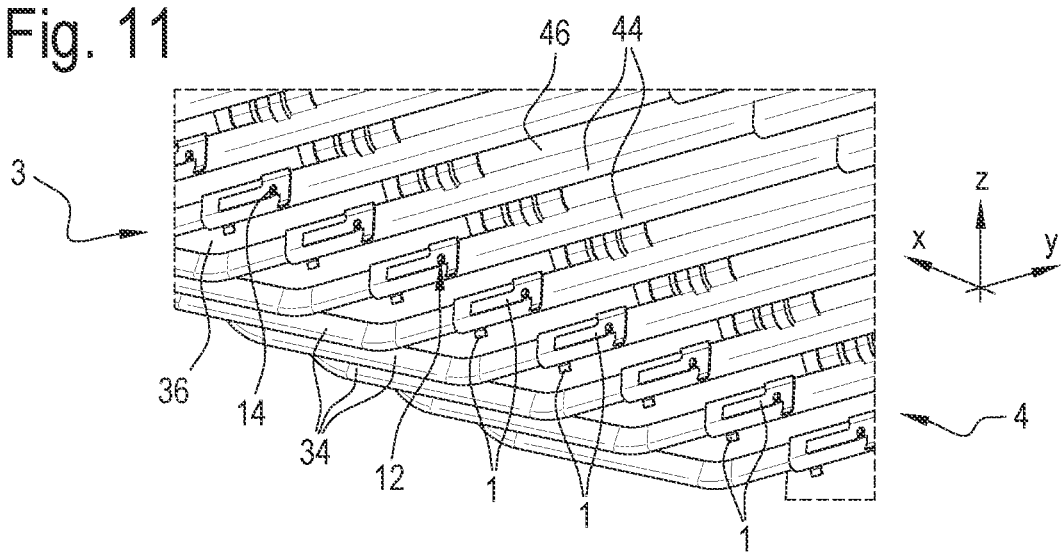
Figure 12:
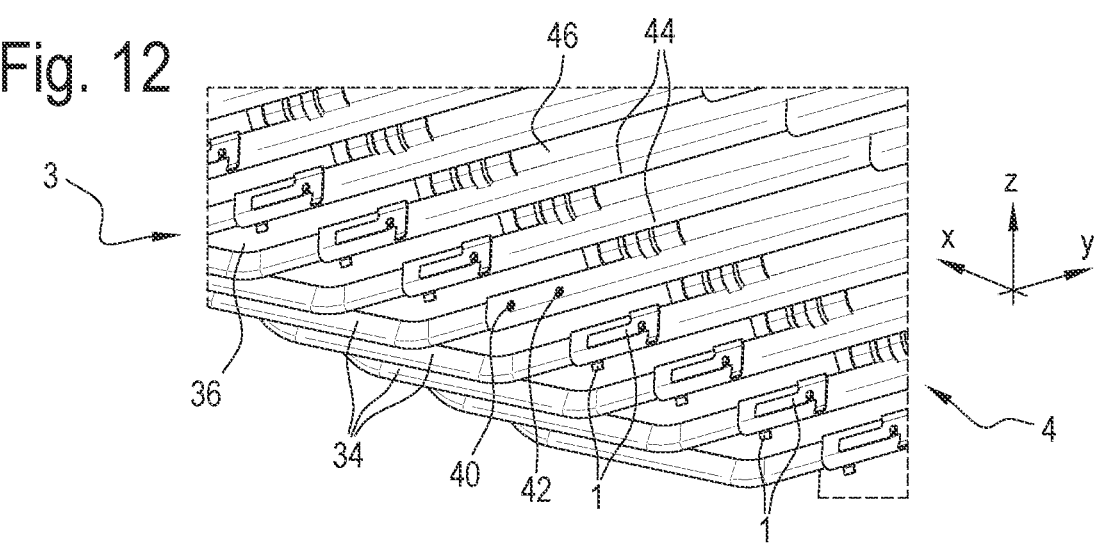
Figure 13:
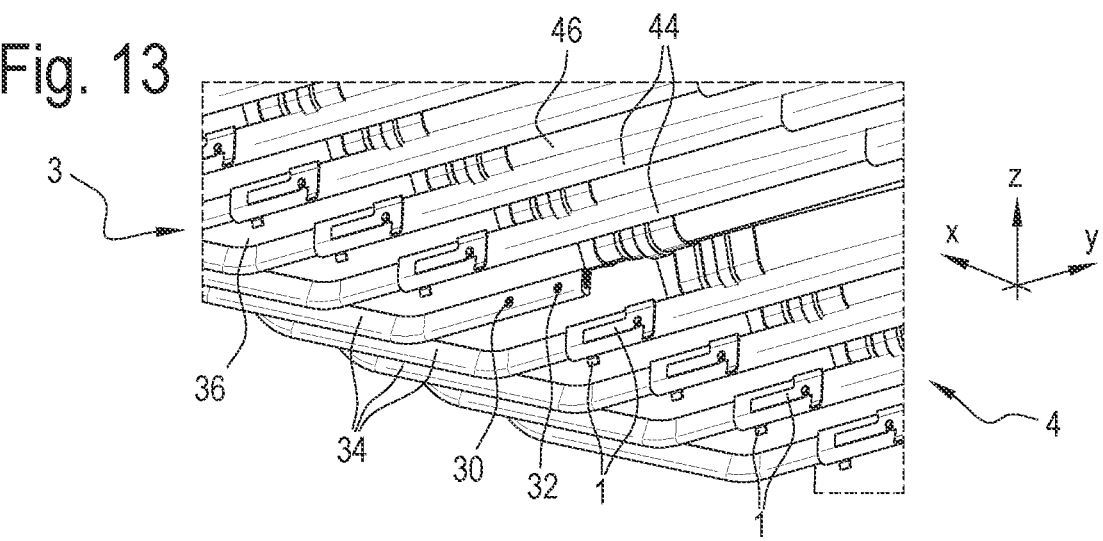

FIGS. 9 to 13 show a non-limiting example of an insulation unit 2 according to one or more embodiments. The insulation unit 2 is illustrated in a front view in FIG. 9 and in a perspective view from below in FIG. 10. Details of the view from below are illustrated in FIGS. 11 to 13. The insulation unit 2 is configured for protecting a passage section between adjacent carriages of an articulated vehicle, where there is in general an articulated system between the carriages known in technical jargon as "fifth wheel". The insulation unit 2 comprises at least the second lower structure 4 and the first lateral structure 3. The first lateral structure 3 may surround the passage section and connect to the second lower structure 4 at both ends of the second structure 4. Alternatively, the first structure 3 may be divided into two sub-structures connected to each other.

The insulation unit 2 of the transit section between adjacent vehicles of an articulated vehicle may comprise:
- a plurality of fixing devices according to one or more embodiments,
- at least a first structure 3, for example lateral, comprising a plurality of first slats 34 and a laminar element 36 connected to the plurality of first slats 34, each first slat 34 having two cavities 30, 32 for example at least at a lateral end,
- at least the second structure 4, for example lower, comprising a plurality of second slats 44 and a laminar element 46 connected to the plurality of second slats 44, each second slat 44 having two cavities 40, 42 at least at a lateral end.

Each second slat 44 can be coupled to a respective first slat 34 by means of a fixing device in the plurality of fixing devices, such that the pins 14 of the first and second fixing elements 1 can be inserted, freely passing through, inside the cavities 30, 32 and 40, 42 of the first and second slats 34, 44 and reversibly coupled to the seats 12 respectively of the second and first fixing elements 1.

According to one aspect, each first slat 34 comprises a pair of cavities 30, 32 at both relative lateral ends. Each second slat 44 comprises a pair of cavities 40, 42 at both relative lateral ends.

According to an aspect of the invention, the zone between one carriage and the adjacent carriage in the articulated vehicles comprises an external bellows which defines the side walls and roof of the region connecting the carriages to each other. The bellows is a protective and insulation element configured to insulate the cross section of passage from the outside.

The bellows may comprise the first lateral structure 3: the first slats 34 may define a rigid frame of the bellows and the laminar element 36 may define the flexible component of the bellows.

Similarly, the second structure 4 may comprise a protective bellows which reduces the entrance of extraneous agents into the passage section. The laminar element 46 may define a flexible element of the bellows and the second slats 44 may define a frame of the bellows. The first slats 34 are located at a predetermined distance from each other; the second slats 44 are also positioned at the same predetermined distance from each other.

FIG. 11 shows a plurality of fixing devices mounted on a respective plurality of first and second slats 34, 44. FIG. 12 shows the cavities 40, 42 of a second slat 44 in the plurality of second slats 44. FIG. 13 shows the cavities 30, 32 of a first slat 34 in the plurality of first slats 34.

One or more embodiments relate to a fixing method, comprising:
- providing at least one fixing device comprising a first fixing element 1 and a second fixing element 1, each fixing element having a body 10 comprising a seat 12 and a pin 14,
- providing a first and a second structure 3, 4, each of said structures 3, 4 having at least a first and a second cavity 30, 32 and 40, 44, preferably two pairs of cavities at both lateral ends of the structures 3, 4,
- inserting, freely passing through, the pin 14 of the first fixing element 1 inside the first cavities 30, 40 of the first and of the second structure 3, 4,
- reversibly coupling the pin 14 of the first fixing element 1 to the seat 12 of the second fixing element 1,
- inserting, freely passing through, the pin 14 of the second fixing element 1 in the second cavities 32, 42 of the first and of the second structure 3, 4, and
- reversibly coupling the pin 14 of the second fixing element 1 to the seat 12 of the first fixing element 1.

According to an aspect, the step of reversibly coupling the pin 14 of the second fixing element 1 to the seat 12 of the first fixing element 1 comprises introducing the pin 14 in the seat 12 by means of a rotary movement of the fixing element 1 about the axis of rotation of the pin 14 of the second fixing element 1. The step of reversibly coupling the pin 14 of the first fixing element 1 to the seat 12 of the second fixing element 1 comprises introducing the pin 14 in the seat 12 by means of a rotary movement of the fixing element 1 about the axis of rotation of the pin 14 of the first fixing element 1.

According to one aspect, the seat 12 of each fixing element 1, if coupled to the respective pin 14 and mounted on the structures 3, 4, faces downwards relative to the third vertical direction Z. In this way, it is possible to further reduce the possibility of accidental unfixing of the fixing elements 1 during use.

What is claimed is:

1. A fixing device for fixing together a first structure and a second structure, each of said first and second structures having at least a first cavity and a second cavity, the fixing device comprising:
a first fixing element and a second fixing element, each of the first and second fixing elements having a body comprising a seat and a pin, wherein:
the pin of the first fixing element is configured to be inserted, freely passing through, in the first cavities of the first structure and the second structure and to be reversibly coupled to the seat of the second fixing element, and
the pin of the second fixing element is configured to be inserted, freely passing through, in the second cavities of the first structure and the second structure and to be reversibly coupled to the seat of the first fixing element,
wherein the body is connected to at least one tab close to the seat, wherein the at least one tab comprises a plate having a first end and a second end opposite the first end, wherein the at least one tab is connected to the body at the first end and wherein the plate is at least partly bent at the second end by a predetermined angle with respect to a first direction of extension of the pin.

2. The fixing device according to claim 1, wherein the predetermined distance of the recess from the second end of the pin is less than or equal to a distance between the body and a projection of the second end of the at least one tab in a plane parallel to the first direction of extension of the pin.

3. The fixing device according to claim 1, wherein the seat comprises a groove made in the body.

4. The fixing device according to claim 1, wherein the seat is substantially shaped as a larger circular arc.

5. A fixing device for fixing together a first structure and a second structure, each of said first and second structures having at least a first cavity and a second cavity, the fixing device comprising:

a first fixing element and a second fixing element, each of the first and second fixing elements having a body comprising a seat and a pin, wherein:

the pin of the first fixing element is configured to be inserted, freely passing through, in the first cavities of the first structure and the second structure and to be reversibly coupled to the seat of the second fixing element, and the pin of the second fixing element is configured to be inserted, freely passing through, in the second cavities of the first structure and the second structure and to be reversibly coupled to the seat of the first fixing element, wherein at least one portion of the body at the seat is tapered in a direction perpendicular to a first direction of extension of the pin.

6. An insulation unit for a passage section between adjacent vehicles in an articulated vehicle, comprising:

a plurality of fixing devices, each of the fixing devices for fixing together a first structure and a second structure, each of said first and second structures having at least a first cavity and a second cavity, each of the fixing devices comprising:

a first fixing element and a second fixing element, each of the first and second fixing elements having a body comprising a seat and a pin, wherein:

the pin of the first fixing element is configured to be inserted, freely passing through, in the first cavities of the first structure and the second structure and to be reversibly coupled to the seat of the second fixing element, and the pin of the second fixing element is configured to be inserted, freely passing through, in the second cavities of the first structure and the second structure and to be reversibly coupled to the seat of the first fixing element, at least a first structure comprising a plurality of first slats and a laminar element connected to the plurality of first slats, each first slat including first and second cavities, at least a second structure comprising a plurality of second slats and a laminar element connected to the plurality of second slats, each second slat including first and second cavities, wherein each second slat is coupled to a respective first slat by one of the fixing devices, the pins of the first and second fixing elements being insertable, freely passing through, respectively, inside the first and second cavities of the first slat and second slat and reversibly coupled to the seats respectively of the second and first fixing elements.

7. A fixing method, comprising:

providing at least one fixing device comprising a first fixing element and a second fixing element, each of the first and second fixing elements including a body comprising a seat and a pin, providing a first structure and a second structure, each of the first and second structures including a first cavity and a second cavity, inserting, freely passing through, the pin of the first fixing element inside the first cavities of the first and second structures, reversibly coupling the pin of the first fixing element to the seat of the second fixing element, inserting, freely passing through, the pin of the second fixing element in the second cavities of the first and second structures, reversibly coupling the pin of the second fixing element to the seat of the first fixing element, wherein the step of reversibly coupling the pin of the second fixing element to the seat of the first fixing element comprises introducing the pin of the second fixing element in the seat of the first fixing element with a rotary movement of the second fixing element, and wherein the step of reversibly coupling the pin of the first fixing element to the seat of the second fixing element comprises introducing the pin of the first fixing element in the seat of the second fixing element with a rotary movement of the first fixing element.

8. A fixing method, comprising:

providing at least one fixing device comprising a first fixing element and a second fixing element, each of the first and second fixing elements including a body comprising a seat and a pin, providing a first structure and a second structure, each of the first and second structures including a first cavity and a second cavity, inserting, freely passing through, the pin of the first fixing element inside the first cavities of the first and second structures, reversibly coupling the pin of the first fixing element to the seat of the second fixing element, inserting, freely passing through, the pin of the second fixing element in the second cavities of the first and second structures, reversibly coupling the pin of the second fixing element to the seat of the first fixing element, wherein the seat of each of the first and second fixing elements, when coupled to the respective pin, faces downwards relative to a vertical direction.

9. The fixing device according to claim 1, wherein the pin comprises a recess configured to engage with the seat, said recess defining a reduction in a thickness of the pin.

10. The fixing device according to claim 9, and further comprising at least one chosen from:

wherein the pin extends along a first direction, and wherein the recess of the pin has an extension along said first direction at least equal to a thickness of the body, and wherein the pin comprises a first end and a second end, opposite to each other, wherein the first end is connected to the body of the fixing element and wherein the recess is at a predetermined distance from the second end, and wherein the seat has an opening, for inserting the pin, with a width between the thickness of the pin at the recess and the thickness of the pin in an adjacent portion of the pin relative to the recess.

* * * * *